Figure 1:
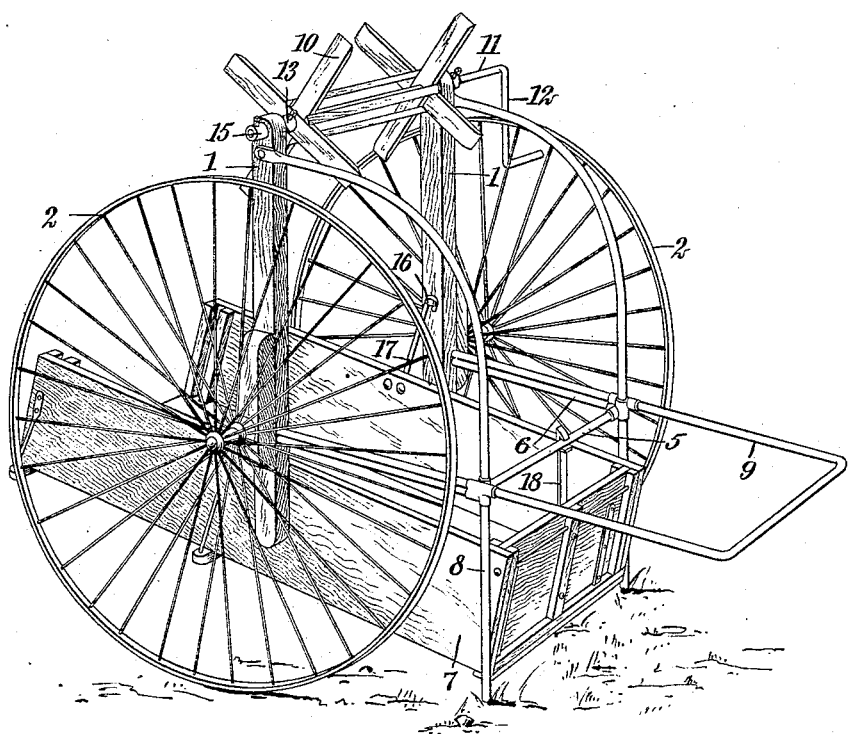

P. C. JORGENSON.
PICK-UP CART.
APPLICATION FILED JUNE 1, 1908.

910,205.

Patented Jan. 19, 1909.

2 SHEETS—SHEET 1.

WITNESSES

INVENTOR
Peter C. Jorgenson
BY
ATTORNEYS

P. C. JORGENSON.
PICK-UP CART.
APPLICATION FILED JUNE 1, 1908.
910,205.
Patented Jan. 19, 1909.
2 SHEETS—SHEET 2.
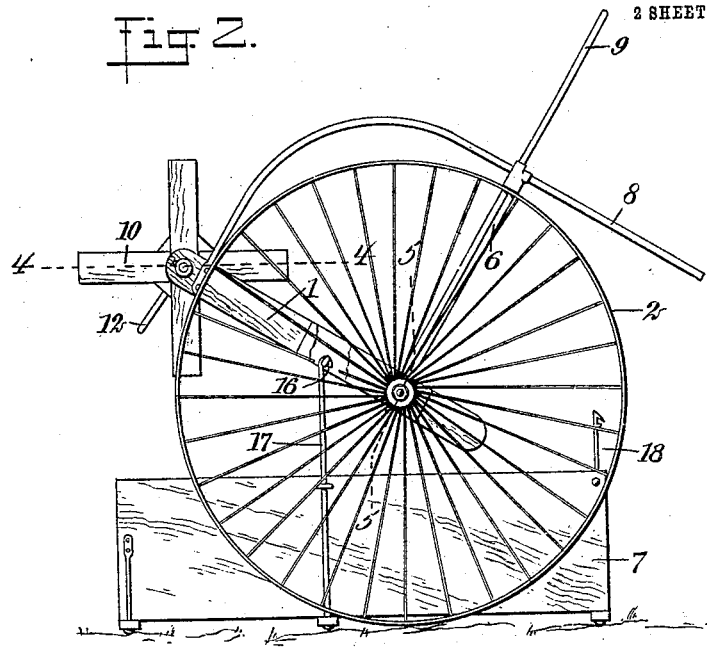
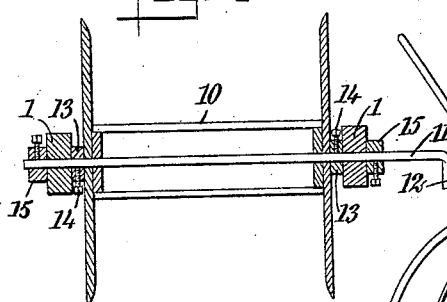
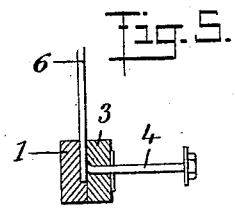
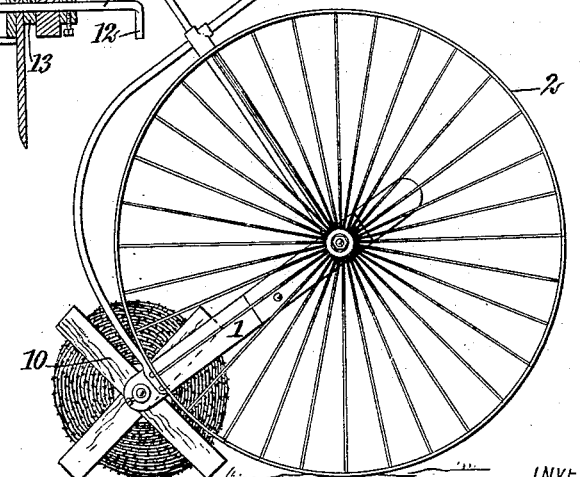
WITNESSES
INVENTOR
Peter C. Jorgenson
BY
ATTORNEYS

UNITED STATES PATENT OFFICE.

PETER C. JORGENSON, OF LEDYARD, IOWA.

PICK-UP CART.

No. 910,205.  Specification of Letters Patent.  Patented Jan. 19, 1909.

Application filed June 1, 1908. Serial No. 435,971.

*To all whom it may concern:*

Be it known that I, PETER C. JORGENSON, a citizen of the United States, and a resident of Ledyard, in the county of Kossuth and State of Iowa, have invented a new and Improved Pick-Up Cart, of which the following is a full, clear, and exact description.

My invention relates to pick-up carts which are adapted to pick up boxes containing materials and reels on which coils of rope or wire may be wound; the cart having standards to which outwardly disposed axles are secured, a frame which is adapted to keep the standards in proper position, a cross-bar, a handle and legs, all of which are secured to the standards, the legs being disposed parallel therewith at their lower terminals. Inward projections in the standards which are disposed above the axles and which are adapted to engage upwardly extending hooks which are secured to a box, a spring hook which is also secured to the box being adapted to engage the cross-bar; the reel having a rod passing therethrough, the rod being also adapted to pass through openings in the standards and to be secured to the reels so that the crank which is secured to the rod may be used to rotate the reel.

In this specification I will describe the preferred form of my invention, but I do not limit myself thereto, as I consider myself entitled to all forms and embodiments of the invention which may be held to fall within the scope of the appended claims.

Reference is to be had to the accompanying drawings, forming a part of this specification, in which similar characters of reference indicate corresponding parts in all the figures, in which—

Figure 1 is a perspective view of the invention; Fig. 2 is a side elevation of the invention showing the cart about to pick up a box; Fig. 3 is a side elevation of the invention showing the cart about to deposit a reel of barb wire, the reel being on the ground; Fig. 4 is an enlarged sectional view on the line 4—4 of Fig. 2; and Fig. 5 is a sectional view of one of the standards, on the line 5—5 of Fig. 2.

By referring to the drawings, it will be seen that I provide standards 1, to which outwardly extending axles 4 are secured, on which the wheels 2 are mounted. These axles may be secured to projecting members 3 which may in turn be secured to the standards 1, but it will be understood that I do not limit myself to this form of construction. A cross-bar 5 is secured to the standards 1 by means of rods 6, this cross-bar 5 serving to keep the standards 1 at a proper distance from each other and also to afford means which will support one end of a box 7, as will be hereinafter described. Legs 8 which are disposed parallel with the standards 1 are continued inwardly until they are secured to the said standards, the legs 8 also being secured to a handle 9 and to the cross-bar 5, the handle being secured to the standards 1. A reel 10 is supported between the standards 1, by means of a rod 11, to one end of which there is secured a crank 12, the rod 11 passing through the standard 1 and also through the reel. The reel has collars 13 in which there are screws 14, which may be brought into engagement with the rod 11 so that the reel 10 will rotate therewith. Collars 15 are also disposed on the rod 11 on the outside of the standards 1, so that the rod 11 will be more firmly held in place, these rods being held in position by means of screws similar to those specified in connection with the collars 13.

On the inner faces of the standards 1 are disposed projections 16, above the axles 4, the projections having heads at their outer terminals. The box 7 has upwardly extending hooks 17 and a spring catch 18, the hooks 17 at either side of the box being adapted to engage with the projections 16, and the spring catch 18, near one terminal of the box being adapted to engage the cross-bar 5.

In using my invention, the cart is wheeled to position over the box 7, when the handle is lifted so that the projections 16 will be disposed a little below the terminals of the hooks 17, when the handle is pushed downwardly causing the projections to move upwardly and thereby engage the hooks 17. This will tend to lift one end of the box slightly from the ground, the hooks 17 being disposed further away from the end to which the spring catch 18 is secured than from the other end of the box, and when the handle is pushed downwardly again, as stated, the cross-bar 5 will come in contact with the spring catch 18 and will engage therewith, so that the handle is moved again upwardly for a slight distance, the box will be found to be supported in the cart so that it may be transported. When the box, which may or may not be loaded, is to be deposited on the ground, the handle is pushed downwardly so that the end of the box to which the spring catch is secured, is on the ground, when the catch may be released from the cross-bar, after which the handle may be lifted upwardly which when the cart is rolled will free the projections from the hooks 17. When the box has been deposited the handle may be moved again so that the reel 10 will rest on the ground, when by unscrewing the screws 14, the rod 11 may be withdrawn, which will permit the reel to rest where placed. In a similar way a reel may be picked up by rolling the cart so that the upper terminals of the standards 1 will be near the ground so that the orifices therein will be in alinement with the orifices in the reel, which will permit the rod 11 to be slipped in position when the set-screw 14 may be screwed down to hold the reel in place.

The cart is designed to be used, among other purposes, for building and repairing barb wire fences, and it will be seen that reels of wire may be carried to desired positions, and at the same time the necessary tools and implements may be conveyed in the box, and that, with the same wheels and standards, many similar reels and boxes may be conveyed to desired places where the wire and the implements will be of service. However, it will be understood that the cart may also be used to carry materials of all kinds in the boxes, and that rope and other material may be wound on the reel, as may be desired.

Having thus described my invention, I claim as new and desire to secure by Letters Patent:

1. A pick-up cart consisting of standards, axles secured thereto, wheels mounted on the axles, projections extending from the standards, means to hold the standards in their relative positions, a box, upwardly projecting hooks which are secured to the box, the hooks being adapted to engage the projections, a hook which is secured to the box and which is adapted to engage the cross-bar, a reel which is adapted to be mounted to revolve with reference to the standards, and a rod which is adapted to be journaled in the standards and to support the reel.

2. A pick-up cart consisting of standards, axles secured thereto, wheels mounted on the axles, projections extending from the standards, a box, upwardly extending hooks secured to the box, the hooks being adapted to engage the projections, means to hold one end of the box steady with reference to the standards, a handle secured to the standards, a reel which is adapted to be mounted to revolve with reference to the standards, and a rod which is adapted to be journaled to the standards and to support the reel.

3. A pick-up cart consisting of standards, axles secured thereto, wheels mounted on the axles, projections extending from the standards, means to keep the standards in their relative positions, a box, upwardly extending hooks which are secured to the box and which are adapted to engage the projections, a hook which is also secured to the box and which is adapted to engage the cross-bar, a reel which is adapted to be mounted to revolve with reference to the standards, a rod which is adapted to be journaled in the standards and to support the reel, means to secure the reel to the rod so that it will rotate therewith, and a crank on the rod.

4. A pick-up cart consisting of standards, axles secured thereto, wheels mounted on the axles, projections extending from the standards, a box, upwardly extending hooks secured to the box, the hooks being adapted to engage the projections, means to hold one end of the box steady with reference to the standards, a handle secured to the standards, a reel which is adapted to be mounted to revolve with reference to the standards, a rod which is adapted to be journaled in the standards and to support the reel, means to secure the reel to the rod so that it will rotate therewith, and a crank on the rod.

In testimony whereof I have signed my name to this specification in the presence of two subscribing witnesses.

PETER C. JORGENSON.

Witnesses:
JUDSON LOUGHLIN,
O. L. GRAVES.